United States Patent
Fujii

(10) Patent No.: US 11,111,397 B2
(45) Date of Patent: Sep. 7, 2021

(54) SILICA-BASED FILM-FORMING COMPOSITION, METHOD OF PRODUCING SUBSTRATE INCLUDING SILICA-BASED FILM, AND ADDITIVE ADDED TO SILICA-BASED FILM-FORMING COMPOSITION

(71) Applicant: Tokyo Ohka Kogyo Co., Ltd., Kanagawa (JP)

(72) Inventor: Yasushi Fujii, Kanagawa (JP)

(73) Assignee: TOKYO OHKA KOGYO CO., LTD., Kanagawa (JP)

(*) Notice: Subject to any disclaimer, the term of this patent is extended or adjusted under 35 U.S.C. 154(b) by 32 days.

(21) Appl. No.: 16/509,789

(22) Filed: Jul. 12, 2019

(65) Prior Publication Data
US 2020/0024463 A1  Jan. 23, 2020

(30) Foreign Application Priority Data

Jul. 17, 2018  (JP) .............................. JP2018-134501

(51) Int. Cl.
*C09D 7/20* (2018.01)
*C09D 1/00* (2006.01)
*C09D 183/00* (2006.01)
*C09D 183/16* (2006.01)

(52) U.S. Cl.
CPC ................ *C09D 7/20* (2018.01); *C09D 1/00* (2013.01); *C09D 183/00* (2013.01); *C09D 183/16* (2013.01)

(58) Field of Classification Search
None
See application file for complete search history.

(56) References Cited

U.S. PATENT DOCUMENTS

| 4,861,569 A * | 8/1989 | Funayama | C08G 77/62 423/324 |
| 2003/0164113 A1 * | 9/2003 | Suzuki | C09D 183/16 106/18.32 |
| 2005/0279255 A1 * | 12/2005 | Suzuki | C04B 41/009 106/287.11 |
| 2010/0112749 A1 * | 5/2010 | Park | H01L 21/02282 438/99 |
| 2018/0201807 A1 * | 7/2018 | Fujii | H01L 21/02282 |
| 2020/0377761 A1 * | 12/2020 | Noya | C09D 183/16 |

FOREIGN PATENT DOCUMENTS

| JP | 6-299118 | 10/1994 | |
| KR | 2011056028 | * 5/2011 | H01L 21/027 |

OTHER PUBLICATIONS

Machine translation of KR-2011056028, translation generated Dec. 2020, 14 pages. (Year: 2020).*

* cited by examiner

*Primary Examiner* — Robert S Loewe
(74) *Attorney, Agent, or Firm* — Wenderoth, Lind & Ponack, L.L.P.

(57) ABSTRACT

To provide a silica-based film-forming composition, which can form a homogeneous silica-based film, a method of producing a substrate including a silica-based film using the composition, and an additive agent to be added to a silica-based film-forming composition. In a silica-based film-forming composition including a polysilazane (A) and a solvent (S), a nitrogen-containing polar organic solvent is included as the solvent (S). In addition, the composition including a polysilazane (A) and a nitrogen-containing polar organic solvent as the solvent (S) is coated onto the surface of a substrate to form a coated film, which is then baked to produce a substrate including a silica-based film.

7 Claims, No Drawings

SILICA-BASED FILM-FORMING COMPOSITION, METHOD OF PRODUCING SUBSTRATE INCLUDING SILICA-BASED FILM, AND ADDITIVE ADDED TO SILICA-BASED FILM-FORMING COMPOSITION

This application is based on and claims the benefit of priority from Japanese Patent Application No. 2018-134501, filed on 17 Jul. 2018, the content of which is incorporated herein by reference.

BACKGROUND OF THE INVENTION

Field of the Invention

The present invention relates to a silica-based film-forming composition, a method of producing a substrate including a silica-based film, and an additive added to a silica-based film-forming composition.

Related Art

Conventionally, polysilazanes have been used as materials forming a film, for example, an insulating film, such as an interlayer insulating film; a passivation film; a protective film; or a planarizing film in an electronic device, such as a semiconductor device. Specifically, a technique of transforming a coated film including a polysilazane into a silica-based film by coating a solution including the polysilazane onto a substrate and heating and baking it in the presence of water molecules is known.

In conversion from a coated film including a polysilazane into a silica-based film, a technique of combining a polysilazane and a reaction catalyst has been also conventionally developed from the viewpoint of promoting the conversion reaction. For example, Patent Document 1 discloses a coating composition including a polysilazane and a specific metal carboxylate. This document shows that a combination of these components gives a dense film having excellent heat resistance, abrasion resistance, and corrosion resistance and being free from cracking by low-temperature baking or without baking.

Patent Document 1: Japanese Unexamined Patent Application, Publication No. H06-299118

SUMMARY OF THE INVENTION

However, the catalyst described in Patent Document 1 does not always show good compatibility to a polysilazane. Accordingly, even if the composition disclosed or suggested in Patent Document 1 is used, an uneven reaction is caused by heating, and as a result, a uniform silica-based film cannot be formed in some cases. Consequently, a composition capable of forming a uniform and high-quality silica-based film is demanded.

The present invention has been made in light of the circumstances described above, and an object thereof is to provide a silica-based film-forming composition which can form a homogeneous silica-based film, a method of producing a substrate including a silica-based film using the composition, and an additive agent to be added to a silica-based film-forming composition.

The present inventors have found that a homogeneous silica-based film can be formed when, in a silica-based film-forming composition including a polysilazane (A) and a solvent (S), a nitrogen-containing polar organic solvent is included as the solvent (S), and thereby the present invention has been accomplished. More particularly, the present invention provides the following.

A first aspect of the present invention is a silica-based film-forming composition, including a polysilazane (A) and a solvent (S),
wherein the solvent (S) includes a nitrogen-containing polar organic solvent.

A second aspect of the present invention is a method of producing a substrate including a silica-based film, the method including: coating the silica-based film-forming composition according to the first aspect onto the surface of a substrate to form a coated film, and
baking the coated film.

A third aspect of the present invention is an additive agent to be added to a silica-based film-forming composition including a polysilazane (A) and a solvent (S), wherein the additive includes a nitrogen-containing polar organic solvent, and,
when the composition is coated onto a substrate to form a coated film, followed by baking the coated film, the additive agent improves curing uniformity of the coated film in the thickness direction of the coated film.

The present invention can provide a silica-based film-forming composition which can form a homogeneous silica-based film, a method of producing a substrate including a silica-based film using the composition, and an additive agent to be added to a silica-based film-forming composition.

DETAILED DESCRIPTION OF THE INVENTION

<<Silica-Based Film-Forming Composition>>

The silica-based film-forming composition includes a polysilazane (A) and a solvent (S). The solvent (S) includes a nitrogen-containing polar organic solvent. The silica-based film-forming composition will now be also simply referred to as "composition." When the silica-based film-forming composition including a polysilazane (A) includes a nitrogen-containing polar organic solvent as the solvent (S), a silica-based film formed by baking a coated film formed using the composition is made homogeneous and film quality is also improved. It should be noted that addition to a silica-based film by baking a coated film formed using the composition is also referred to as "curing" in the specification and claims according to the present application.

Essential or optional components included in the silica-based film-forming composition will now be described.

<Polysilazane (A)>

The silica-based film-forming composition includes a polysilazane (A). The polysilazane (A) is appropriately selected from known materials. A compound having a Si—N bond in the compound structure (chemical structure), for example, is typically used as the polysilazane (A).

Among known polysilazane materials, a polymer (polysilazane) including a structural unit represented by Formula (A0) below is preferably used in the present embodiment from the viewpoint of, for example, easiness in handling and easy availability:

$$-(SiR^{a1}R^{a2}-NR^{a3})-\qquad(A0).$$

In Formula (A0) above, $R^{a1}$, $R^{a2}$, and $R^{a3}$, which may be the same or different, are each independently a hydrogen atom, an alkyl group, a cycloalkyl group, or an aryl group.

Herein, the alkyl group as $R^{a1}$, $R^{a2}$, and $R^{a3}$ can be, for example, an alkyl group having 1 or more 12 or less carbon atoms. The alkyl group may be a straight chain or a branched chain. Specific examples of the alkyl group include a methyl group, an ethyl group, an n-propyl group, an isopropyl group, an n-butyl group, an isobutyl group, a sec-butyl group, a tert-butyl group, an n-pentyl group, an n-hexyl group, an n-octyl group, an n-nonyl group, an n-decyl group, and the like. The cycloalkyl group can be, for example, a cycloalkyl group having 3 or more 12 or less carbon atoms. Specific examples of the cycloalkyl group include a cyclopropyl group, a cyclobutyl group, a cyclopentyl group, cyclohexyl, a cycloheptyl group, a cyclooctyl group, a cyclononyl group, a cyclodecyl group, a cycloundecyl group, a cyclododecyl group, and the like. The aryl group can be, for example, an aryl group having 6 or more 12 or less carbon atoms. Specific examples of the aryl group include a phenyl group, a tolyl group (methylphenyl group), a xylyl group (dimethylphenyl group), a naphthyl group, and the like.

The number of the structural units represented by Formula (A0) included in the polysilazane (A) is usually an integer of two or more, and the upper limit of the number can be appropriately set to, for example, 3000 or less.

The polysilazane (A) may include an N—Li bond, an N—K bond, or an N—Na bond or the like in a part of the compound structure (chemical structure).

The polysilazane (A) preferably includes a structural unit represented by Formula (A0) in which $R^{a1}$, $R^{a2}$, and $R^{a3}$ are all hydrogen, i.e., a structural unit represented by Formula (A1) below, from the viewpoint of the smooth progress of the transformation into silica. The structural unit represented by Formula (A1) is easily converted into silica ($SiO_2$) by baking or sintering (usually, the conversion reaction herein is accompanied by occurrence of ammonia and hydrogen). In addition, a polysilazane including a structural unit represented by Formula (A0) above in which at least one of $R^{a1}$, $R^{a2}$, and $R^{a3}$ is a carbon-containing functional group (an alkyl group, a cycloalkyl group, or an aryl group) in addition to the structural unit represented by Formula (A1) can also be preferably used as the polysilazane (A).

[Chem. 1]

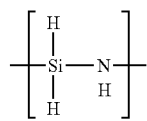

(A1)

The polysilazane (A) may include, for example, a structural unit having a branched structure as represented by Formula (A2) or Formula (A3) below, considering the physical properties of the silica-based film after baking. $R^{a1}$ and $R^{a3}$ in Formula (A2) below and Formula (A3) below are synonymous with $R^{a1}$ and $R^{a3}$ in Formula (A0), respectively.

[Chem. 2]

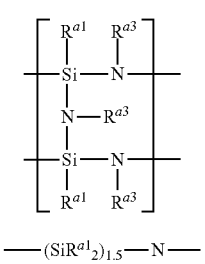

(A2)

(A3)

Such a polysilazane (A) can be synthesized by a known procedure, or a commercially available polysilazane material can be purchased. When the polysilazane (A) is synthesized, a technique in which a compound including a —NH group in the molecule, typified by ammonia, and a compound including a Si—Cl group in the molecule are mixed and heated to condense (polymerize) these compounds, for example, can be employed. The heating conditions herein may be appropriately set in light of the structure and molecular weight of a polysilazane to be obtained.

The weight-average molecular weight of the polysilazane (A) is not particularly limited. The weight-average molecular weight of the polysilazane (A) is preferably 100 or more 10000 or less, more preferably 500 or more 8000 or less, and further preferably 800 or more 5000 or less.

The lower limit of the content of the polysilazane (A) in the total solid content of the silica-based film-forming composition is not particularly limited. The lower limit is, for example, 10 mass % or more, preferably 20 mass % or more, and more preferably 40 mass % or more. Similarly, the upper limit of the content of the polysilazane (A) in the total solid content of the silica-based film-forming composition is not particularly limited. The upper limit may be 100 mass %, and is preferably 99 mass % or less, more preferably 98 mass % or less, and further preferably 95 mass % or less.

<Organic Phosphorus Compound>

The composition may include an organic phosphorus compound for more smoothly converting the polysilazane (A) into silica. In the specification, the term "organic phosphorus compound" is used as a concept encompassing not only a single compound including a phosphorus atom in the structure but also a composite of a molecule including a phosphorus atom in the structure and another molecule. Examples of the organic phosphorus compound include phosphine compounds, such as tributylphosphine, triphenylphosphine, tris(p-tolyl)phosphine, tris(m-tolyl)phosphine, tris(o-tolyl)phosphine, diphenylcyclohexylphosphine, tricyclohexylphosphine, tris(dimethoxyphenyl) phosphine, and 1,4-bis(diphenylphosphino)butane; phosphonium salts, such as ethyltriphenylphosphonium bromide and benzyltriphenylphosphonium chloride; composites of an organic phosphorus compound and a boron compound, such as triphenylphosphine triphenylborane, tetraphenylphosphonium tetra-p-tolylborate, and tetraphenylphosphonium tetraphenylborate; and composites of an organic phosphorus compound and a nitrogen compound, such as tetraphenylphosphonium thiocyanate, tetraphenylphosphonium dicyanamide, and n-butyltriphenylphosphonium dicyanamide; and the like.

When the composition includes an organic phosphorus compound, the lower limit of the content of the organic phosphorus compound in the composition is, for example, 1 part by mass or more, preferably 2 parts by mass or more, further preferably 3 parts by mass or more, and may be 5 parts by mass or more, with respect to 100 parts by mass of the polysilazane (A) from the viewpoint of promoting the transformation of the polysilazane (A) into silica. Similarly, when the composition includes an organic phosphorus compound, the upper limit of the content of the organic phosphorus compound in the composition is, for example, 30 parts by mass or less, preferably 25 parts by mass or less, further preferably 15 parts by mass or less, and may be 10 parts by mass or less, with respect to 100 parts by mass of the polysilazane (A) from the viewpoint of the storage stability of the composition.

<Imidazole Group-Containing Compound (B) Represented by Formula (B)>

The composition may include an imidazole group-containing compound (B) represented by Formula (B) (hereinafter, also simply referred to as "imidazole group-containing compound (B)") without defeating the purpose of the present invention. It is preferred that the composition of the present invention does not include the imidazole group-containing compound (B). The imidazole group-containing compound (B) is, as shown in Formula (B), a compound including an imidazole group (imidazole ring) in the molecule. The imidazole group-containing compound (B) has the action of promoting the conversion of polysilazane (A) into silica by baking. However, when the composition includes the imidazole group-containing compound (B), there is a difference in the reaction of polysilazane by the imidazole group-containing compound (B) between the surface of a film and the inside of the film depending on conditions of use (a substrate to be coated, baking temperature, etc.), and the quality of the silica-based film can be uneven.

The imidazole group-containing compound (B) is represented by Formula (B) below.

[Chem. 3]

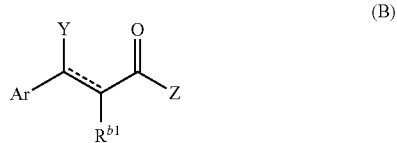

(B)

(in Formula (B), Ar is an aromatic group which may include a substituent; $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, or an organic group; Y is an imidazole ring represented by Formula (B-y) below or a hydrogen atom; Z is an imidazole ring represented by Formula (B-y) below or a group represented by —$OR^{b3}$; Y or Z is the imidazole ring; and

[Chem. 4]

----- is a single bond when Y is the imidazole ring and is a carbon-carbon double bond when Z is the imidazole ring, and $R^{b3}$ is a hydrogen atom or an organic group),

[Chem. 5]

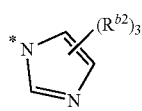

(B-y)

(in Formula (B-y), the symbol * represents a bond that binds to a carbon atom adjacent to Y or Z in Formula (B) above; $R^{b2}$s are each independently a hydrogen atom, a halogen atom, a hydroxyl group, a mercapto group, a sulfide group, a silyl group, a silanol group, a nitro group, a nitroso group, a sulfonate group, a phosphino group, a phosphinyl group, a phosphonate group, or an organic group).

In Formula (B), Ar is an aromatic group which may include a substituent. Ar may be an unsubstituted aromatic group. The aromatic group, which may include a substituent, may be an aromatic hydrocarbon group which may include a substituent, or an aromatic heterocyclic group which may include a substituent.

Ar is preferably a phenyl group which may include a substituent, a furyl group which may include a substituent, or a thienyl group which may include a substituent, because a compound represented by Formula (B) can be inexpensively and easily synthesized and has good solubility in an organic solvent.

In Formula (B),

[Chem.6]

----- is a single bond when Y is an imidazole ring represented by Formula (B-y) and is a carbon-carbon double bond when Z is the imidazole ring.

In Formula (B-y), the symbol * represents a bond that binds to a carbon atom adjacent to Y or Z in Formula (B).

Specific examples of the imidazole group-containing compound (B) include imidazole group-containing compounds represented by Formula (B1) or Formula (B2).

(Imidazole Group-Containing Compound Represented by Formula (B1))

One aspect of the imidazole group-containing compound (B) is an imidazole group-containing compound represented by Formula (B1) below, for example.

[Chem. 7]

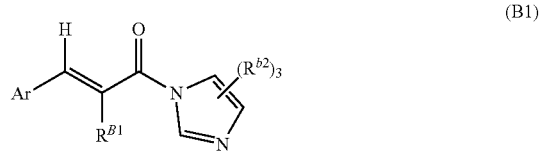

(B1)

(in Formula (B1), $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, or an organic group; $R^{b2}$s are each independently a hydrogen atom, a halogen atom, a hydroxyl group, a mercapto group, a sulfide group, a silyl group, a silanol group, a nitro group, a nitroso group, a sulfonate group, a phosphino group, a phosphinyl group, a phosphonate group, or an organic group; and Ar is an aromatic group which may include a substituent).

In Formula (B1), $R^{b1}$, $R^{b2}$, and Ar are respectively the same as those in Formula (B). Accordingly, the descriptions thereof are omitted herein.

Among the imidazole group-containing compounds represented by Formula (B1), a compound represented by Formula (B1-1) below is preferred from the viewpoint of the solubility in the solvent (S) and the compatibility to the polysilazane (A) in the embodiment.

[Chem. 8]

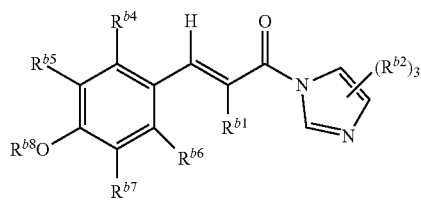

(B1-1)

(in Formula (B1-1), $R^{b1}$ and $R^{b2}$ are synonymous with those in Formula (B1); $R^{b4}$ to $R^{b7}$ are each independently a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, an amino group, an ammonio group, or an organic group; and $R^{b8}$ is a hydrogen atom or an organic group).

Suitable specific examples of the compound represented by Formula (B1) include the following.

[Chem. 9]

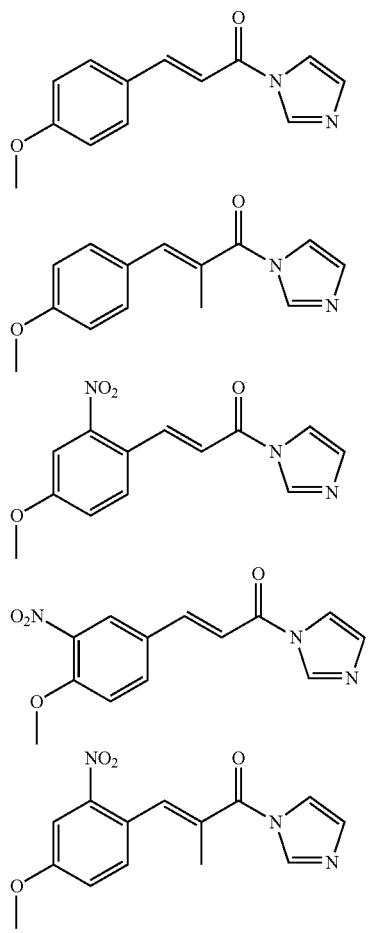

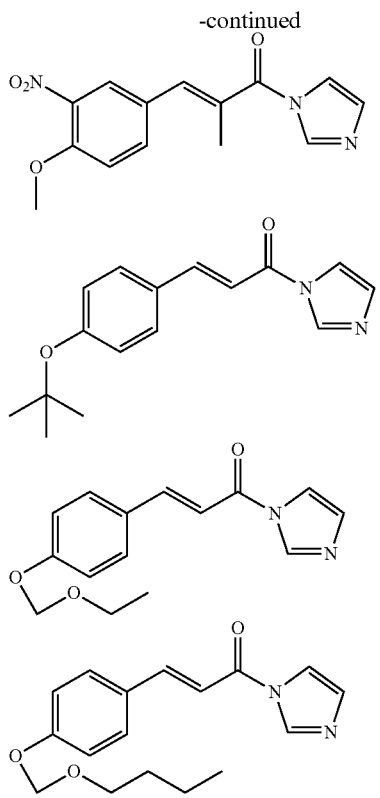

(Imidazole Group-Containing Compound Represented by Formula (B2))

Another aspect of the imidazole group-containing compound (B) is an imidazole group-containing compound (B) represented by Formula (B2) below. The imidazole group-containing compound (B) represented by Formula (B2) corresponds to a compound prepared by applying a compound represented by Formula (81) above to heating conditions and relocating the imidazole group to the β-position of the α,β-unsaturated carbonyl site. Accordingly, the same effect as that of the compound represented by Formula (B1) shown above can be provided in a method of producing a silica-based film described later.

[Chem. 10]

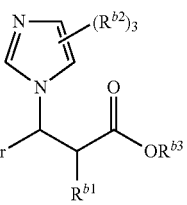

(B2)

(In Formula (B2), $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, or an organic group; $R^{b2}$s are each independently a hydrogen atom, a halogen atom, a hydroxyl group, a mercapto group, a sulfide group, a silyl group, a silanol group, a nitro group, a nitroso group, a sulfonate group, a phosphino group, a phosphinyl group, a phosphonate group, or an organic group; $R^{b3}$ is a hydrogen atom or an organic group; and Ar is an aromatic group which may include a substituent.)

Among the imidazole group-containing compounds represented by Formula (B2), a compound represented by Formula (B2-1) below is preferred from the viewpoint of the solubility in the solvent (S) and the compatibility to the polysilazane (A).

[Chem. 11]

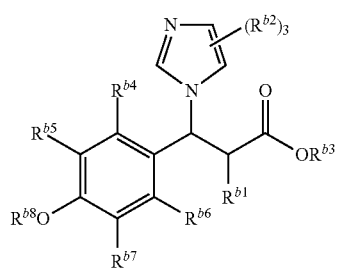

(B2-1)

(In Formula (B2-1), $R^{b1}$, $R^{b2}$, and $R^{b3}$ are synonymous with those in Formula (B2); $R^{b4}$ to $R^{b7}$ are each independently a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, an amino group, an ammonio group, or an organic group; and $R^{b8}$ is a hydrogen atom or an organic group).

Suitable specific examples of the compound represented by Formula (B2) include the following.

[Chem. 12]

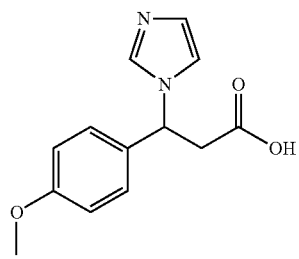

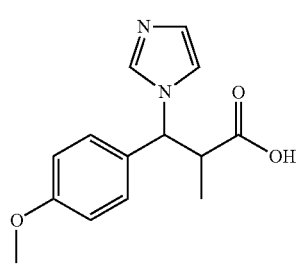

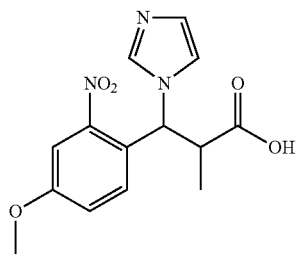

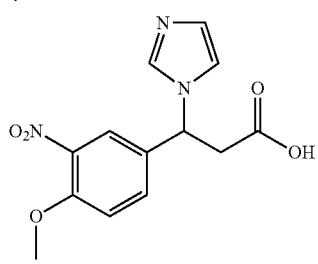

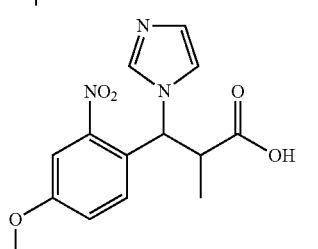

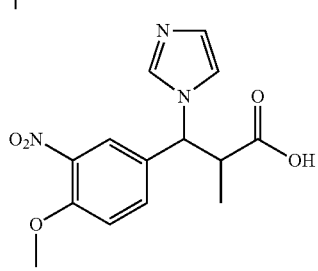

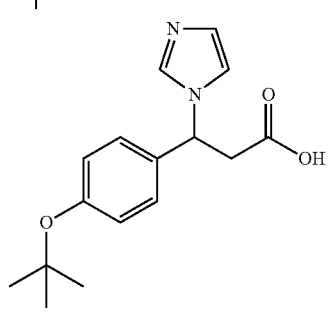

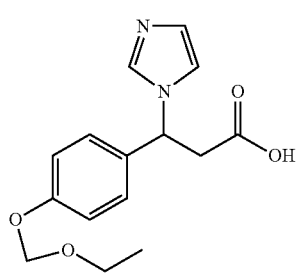

-continued

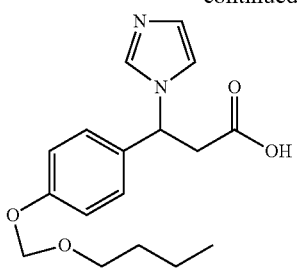
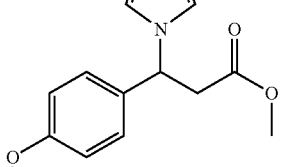
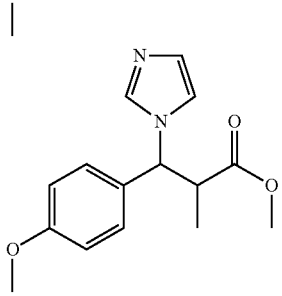
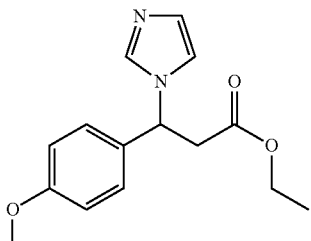
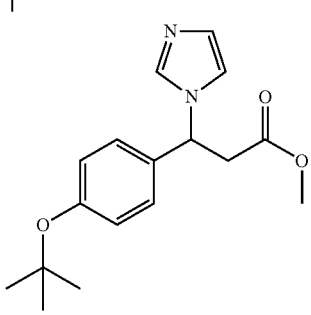
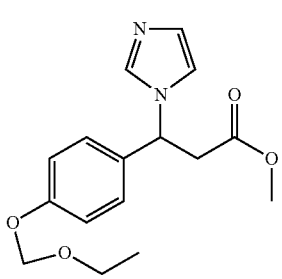

-continued

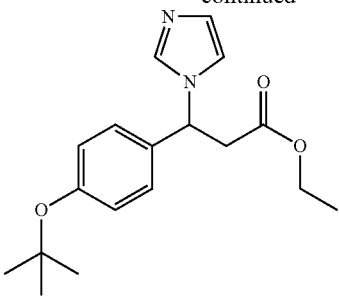

As described above, it is preferred that the composition of the present invention does not include the imidazole group-containing compound (B).

<Solvent (S)>

The composition includes a solvent (S) for adjusting the coating properties and the viscosity. The solvent (S) includes a nitrogen-containing polar organic solvent. Here, the nitrogen-containing polar organic solvent is an organic solvent generally recognized as a polar solvent, and is not particularly limited as long as the organic solvent includes a nitrogen atom in its structure. The nitrogen-containing polar organic solvent in the present application is typically a nitrogen-containing organic solvent having a permittivity of 10 or more. The specific permittivity of the nitrogen-containing polar organic solvent is preferably 15 or more, and more preferably 20 or more. The upper limit of the permittivity of the nitrogen-containing polar organic solvent is not particularly limited, and is commonly 60 or less.

When the composition includes a nitrogen-containing polar organic solvent as the solvent (S), a silica-based film which is homogeneous particularly in the thickness direction can be formed by baking a coated film formed using the composition.

The boiling point of the nitrogen-containing polar organic solvent under atmospheric pressure is not particularly limited. The boiling point of the nitrogen-containing polar organic solvent under atmospheric pressure is preferably 80° C. or higher, more preferably 120° C. or higher and further preferably 150° C. or higher because changes in the solid content concentration in the composition over time are easily suppressed and, when baking a coated film formed using the composition, the solvent does not excessively quickly volatilize from the coated film. The boiling point of the nitrogen-containing polar organic solvent is for example 170° C. or higher, and may be 200° C. or higher, 230° C. or higher or 250° C. or higher. The boiling point of the nitrogen-containing polar organic solvent under atmospheric pressure is preferably 300° C. or lower, more preferably 280° C. or lower, and further preferably 250° C. or lower because the nitrogen-containing polar organic solvent does not easily remain in a silica-based film finally formed. The boiling point of the nitrogen-containing polar organic solvent under atmospheric pressure may be 230° C. or lower, 200° C. or lower, or 170° C. or lower.

The nitrogen-containing polar organic solvent is preferably a compound having a partial structure represented by Formula (S1) below because the conversion of a polysilazane (A) into silica is easily allowed to homogeneously proceed:

$$—NR^{s1}—C(=O)— \qquad (S1)$$

(in Formula (S1), $R^{s1}$ is a hydrogen atom or a hydrocarbon group which may include a substituent). In addition, the nitrogen-containing polar organic solvent is more preferably a compound having a partial structure represented by Formula (S1-1) below because the effect of allowing the conversion of a polysilazane (A) into silica to homogeneously proceed is particularly good.

$$-NR^{s1}-C(=O)-NR^{s2}- \quad (S1\text{-}1)$$

(in Formula (S1-1), $R^{s1}$ and $R^{s2}$ are each independently a hydrogen atom or a hydrocarbon group which may include a substituent).

Among the compounds having the aforementioned partial structure as the nitrogen-containing polar organic solvent, a compound represented by Formula (S2) below is particularly preferred.

$$R^{s1}R^{s3}N-C(=O)-NR^{s2}R^{s4} \quad (S2)$$

(in Formula (S2), $R^{s1}$ to $R^{s4}$ are each independently a hydrogen atom or a hydrocarbon group which may include a substituent, and $R^{s3}$ and $R^{s4}$ may be bound to each other).

In Formula (S1), Formula (S1-1) and Formula (S2) above, when $R^{s1}$ to $R^{s4}$ are a hydrocarbon group which may include a substituent, the hydrocarbon group may be an aliphatic hydrocarbon group or an aromatic hydrocarbon group. The hydrocarbon group is preferably an aliphatic hydrocarbon group because, for example its boiling point is low and the nitrogen-containing polar organic solvent does not easily remain in the film after the silica-based film is formed. When $R^{s1}$ to $R^{s4}$ are the aliphatic hydrocarbon group which may include a substituent, the aliphatic hydrocarbon group may be an unsaturated aliphatic hydrocarbon group or saturated aliphatic hydrocarbon group, and a saturated aliphatic hydrocarbon group is preferred. When $R^{s1}$ to $R^{s4}$ are an aliphatic hydrocarbon group, the aliphatic hydrocarbon group may be straight, branched, cyclic or have a combination of these structures. The substituent which a hydrocarbon group as $R^{s1}$ to $R^{s4}$ may have is not particularly limited without defeating the purpose of the present invention. Examples of the substituent include a hydroxyl group, a mercapto group, an alkoxy group having 1 or more 4 or less carbon atoms, an alkylthio group having 1 or more 4 or less carbon atoms, an aliphatic acyl group having 2 or more 4 or less carbon atoms, an aliphatic acyloxy group having 2 or more 4 or less carbon atoms, an amino group, a halogen atom, a nitro group, a cyano group and the like. The number of substituents in the hydrocarbon group is not particularly limited. The number of substituents in the hydrocarbon group is typically 0 or more 5 or less, preferably 0 or more 3 or less, and more preferably 0 or 1.

$R^{s1}$ to $R^{s4}$ have been described above; however, $R^{s1}$ to $R^{s4}$ are preferably an unsubstituted straight or branched alkyl group having 1 or more 4 or less carbon atoms. Specific examples of the alkyl group include a methyl group, an ethyl group, an n-propyl group, an isopropyl group, an n-butyl group, an isobutyl group, a sec-butyl group and a tert-butyl group.

The composition preferably includes as a solvent (S) a compound having a partial structure represented by Formula (S1), wherein $R^{s1}$ is an alkyl group having 1 or more 4 or less carbon atoms. Specific examples of the compound having a partial structure represented by Formula (S1), wherein $R^{s1}$ is an alkyl group having 1 or more 4 or less carbon atoms include N-alkylformamides such as N-methylformamide, N-ethylformamide, N-n-propylformamide, N-isopropylformamide, and N-n-butylformamide; N-alkylacetamides such as N-methylacetamide, N-ethylacetamide, N-n-propylacetamide, N-isopropylacetamide, and N-n-butylacetamide; N-alkylpropionamides such as N-methylpropionamide, N-ethylpropionamide, N-n-propylpropionamide, N-isopropylpropionamide, and N-n-butylpropionamide; N,N-dialkylformamides such as N,N-dimethylformamide, N,N-diethylformamide, N,N-di-n-propylformamide, N,N-diisopropylformamide, and N,N-di-n-butylformamide; N,N-dialkylacetamides such as N,N-dimethylacetamide, N,N-diethylacetamide, N,N-di-n-propylacetamide, N,N-diisopropylacetamide, and N,N-di-n-butylacetamide; N,N-dialkylpropionamides such as N,N-dimethylpropionamide, N,N-diethylpropionamide, N,N-di-n-propylpropionamide, N,N-diisopropylpropionamide, and N,N-di-n-butylpropionamide; N-alkylureas such as N-methylurea, N-ethylurea, N-n-propylurea, N-isopropylurea, and N-n-butylurea; N,N-dialkylureas such as N,N'-dimethylurea, N,N'-diethylurea, N,N'-di-n-propylurea, N,N'-diisopropylurea, and N,N'-di-n-butylurea; N-alkyllactams such as N-methyl-2-pyrrolidone, N-ethyl-2-pyrrolidone, N-n-propyl-2-pyrrolidone, N-isopropyl-2-pyrrolidone, N-n-butyl-2-pyrrolidone, N-methyl-2-piperidone, N-ethyl-2-piperidone, N-n-propyl-2-piperidone, N-isopropyl-2-piperidone, and N-n-butyl-2-piperidone; 1,3-dialkylimidazolidinones such as 1,3-dimethyl-2-imidazolidinone, 1,3-diethyl-2-imidazolidinone, 1,3-di-n-propyl-2-imidazolidinone, 1,3-diisopropyl-2-imidazolidinone, and 1,3-di-n-butyl-2-imidazolidinone; N,N'-dialkylpropyleneureas such as N,N'-dimethylpropyleneurea, N,N'-diethylpropyleneurea, N,N'-di-n-propylpropyleneurea, N,N'-diisopropylpropyleneurea, and N,N'-di-n-butylpropyleneurea; and the like.

The composition more preferably includes as a solvent (S) a compound having a partial structure represented by Formula (S1-1), wherein $R^{s1}$ and $R^{s2}$ are each an alkyl group having 1 or more 4 or less carbon atoms. Specific examples of the compound include the aforementioned N,N'-dialkylureas, N,N,N',N'-tetraalkylurea, 1,3-dialkylimidazolidinones, and N,N'-dialkylpropyleneureas.

In addition, the composition preferably includes as a solvent (S) a compound represented by Formula (S2), wherein $R^{s1}$ to $R^{s4}$ are each independently an alkyl group having 1 or more 4 or less carbon atoms, and $R^{s3}$ and $R^{s4}$ may be bound to each other to form an alkylene group having 2 or more 8 or less carbon atoms. Specific examples of the compound include the aforementioned N,N,N',N'-tetraalkylurea, 1,3-dialkylimidazolidinones, and N,N'-dialkylpropyleneureas.

It is preferred that the composition includes 1,3-dimethyl-2-imidazolidinone and/or N,N,N',N'-tetramethylurea as the nitrogen-containing polar organic solvent because of easy availability and the good effect of homogenizing the silica-based film to be produced.

The content of the nitrogen-containing polar organic solvent in the composition is not particularly limited as long as a desired effect is obtained. The content of the nitrogen-containing polar organic solvent is typically preferably 0.1 mass % or more, more preferably 0.5 mass % or more, further preferably 1 mass % or more, and particularly preferably 2 mass % or more with respect to the mass of the solid content in the composition. The content of the nitrogen-containing polar organic solvent is typically preferably 20 mass % or less, more preferably 15 mass % or less, further preferably 12 mass % or less, and particularly preferably 10 mass % or less with respect to the mass of the solid content in the composition.

Specific examples of the solvent (S) other than the nitrogen-containing polar organic solvent include (poly)alkylene glycol monoalkyl ethers, such as ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether; (poly)alkylene glycol monoalkyl ether acetates, such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate (PGMEA), and propylene glycol monoethyl ether acetate; other ethers, such as diethylene glycol dimethyl ether, diethylene glycol methylethyl ether, diethylene glycol diethyl ether, diethyl ether, dipropyl ether, dibutyl ether (di-n-butyl ether and di-tert-butyl ether), cyclopentyl methyl ether, and tetrahydrofuran; ketones, such as methyl ethyl ketone, cyclohexanone, 2-heptanone, and 3-heptanone; alkyl lactic acid esters, such as 2-hydroxypropionic acid methyl ester and 2-hydroxypropionic acid ethyl ester; other esters, such as 2-hydroxy-2-methylpropionic acid ethyl ester, 3-methoxypropionic acid methyl ester, 3-methoxypropionic acid ethyl ester, 3-ethoxypropionic acid methyl ester, 3-ethoxypropionic acid ethyl ester, ethoxyacetic acid ethyl ester, hydroxyacetic acid ethyl ester, 2-hydroxy-3-methylbutanoic acid methyl ester, 3-methoxybutyl acetate, 3-methyl-3-methoxybutyl acetate, 3-methyl-3-methoxybutyl propionate, ethyl acetate, n-propyl acetate, isopropyl acetate, n-butyl acetate, isobutyl acetate, n-pentyl formate, isopentyl acetate, benzyl acetate, n-butyl propionate, ethyl butyrate, n-propyl butyrate, isopropyl butyrate, n-butyl butyrate, methyl pyruvate, ethyl pyruvate, n-propyl pyruvate, methyl acetoacetate, ethyl acetoacetate, and 2-oxobutanoic acid ethyl ester; aromatic hydrocarbons, such as toluene and xylene; and the like.

Among these, preferred are alkylene glycol monoalkyl ethers, alkylene glycol monoalkyl ether acetates, the aforementioned other ethers, and the like, and more preferred are the aforementioned other ethers. The solvents (S) other than the nitrogen-containing polar organic solvent can be used alone or in combination of two or more thereof.

The amount of the solvent (S) when used may be appropriately set in light of, for example, the coating properties of the composition. For example, the solvent (S) can be used such that the solid content concentration of the composition is 1 mass % or more, preferably 3 mass % or more, and further preferably 5 mass % or more. Similarly, the solvent (S) can be used such that the solid content concentration of the composition is preferably 50 mass % or less and further preferably 40 mass % or less.

<Other Components>

The composition can also include other additive components as needed, in addition to the components mentioned above. Examples of the components include catalysts, such as metal carboxylates for promoting the conversion of a polysilazane (A) into silica, viscosity modifiers for adjusting the viscosity of the composition, leveling agents, and the like. The amounts of these components are appropriately set according to the purpose.

<Method of Preparing Composition>

The composition described above can be prepared by mixing the aforementioned components in predetermined amounts and then uniformly mixing them with a mixer. The obtained mixture may be filtered through a filter to obtain a more uniform mixture.

<<Method of Producing Silica-Based Film>>

Using the silica-based film-forming composition described above, a silica-based film is formed. The silica-based film can form, for example, an insulating film, a passivation film, a leveling film, and a hardmask in semiconductor devices. That is, it can be said that the aforementioned composition can be suitably used to form these various types of film and hardmask.

The method of producing a silica-based film typically includes coating the aforementioned silica-based film-forming composition onto the surface of a substrate to form a coated film, and baking the coated film.

The substrate may be appropriately selected according to uses. For example, a semiconductor substrate, such as a silicon substrate; a glass substrate; a metal substrate, such as a copper substrate or an aluminum substrate; or a resin substrate, such as a polyethylene terephthalate (PET) substrate, can be used as the substrate in the method of producing a silica-based film. Additionally, regarding a substrate laminated with a layer constituted of another component or a substrate provided with a circuit and so on, the laminated layer or the circuit can also be included together with the substrate for treatment. Among these, in the method of producing a silica-based film, the semiconductor substrate can easily withstand the baking conditions described later and therefore can be preferably used.

In addition, a substrate having unevenness on the surface thereof is preferably used as the substrate. When a silica-based film is formed using the aforementioned composition, the silica-based film can be made uniform in the thickness direction. When the surface of a substrate has unevenness, a thick portion and a thin portion of a silica-based film are formed. However, when a silica-based film is formed using the aforementioned composition, a silica-based film in which a thick portion and a thin portion are homogeneous is easily formed. The shape of unevenness is not particularly limited. For example, typical examples of the shape of unevenness include a line and space pattern, a dot pattern, a hole pattern and the like.

The composition is coated onto the substrate described above. The coating method can be appropriately selected considering, for example, the type of the substrate and the physical properties of the composition. More specifically, as the coating method, for example, a spin coating method, a dipping method, a spraying method, a roll coating method, a transfer method, or a slit coating method can be employed. Furthermore, from the viewpoint of efficiently achieving a desired film thickness, a combination of these coating methods may be also carried out. Among these coating methods, from the viewpoint of stabilizing the coated film thickness and improving the process efficiency, the spin coating method is preferably employed.

In the method of producing a silica-based film, the coated film can be pre-baked after coating the composition and before baking, which will be described below. The pre-baking can effectively remove the solvent (S) in the film and contributes to improvement in process efficiency. Furthermore, an object of this pre-baking may be precuring for the subsequent baking. The temperature conditions and the time conditions of the pre-baking can be appropriately set according to the contents of the composition. For example, the temperature conditions that can be employed are 50° C. or higher 300° C. or lower, and preferably 75° C. or higher 250° C. or lower. The time conditions that can be employed are, for example, 20 seconds or more 900 seconds or less, and preferably 60 seconds or more 300 seconds or less. Regarding the temperature conditions, pre-baking may be carried out at a constant temperature or may be carried out while gradually changing the temperature. The apparatus for pre-baking can be appropriately selected. As an example, a hot plate can be used.

The thickness of the coated film obtained after coating (or after pre-baking) can be appropriately set according to the uses of the ultimately obtained silica-based film. The thickness of the coated film is, for example, 10 nm or more, preferably 30 nm or more, and more preferably 50 nm or more. At the same time, the thickness of the coated film is, for example, 2500 nm or less, preferably 2000 nm or less, and more preferably 1500 nm or less. The thickness of the coated film after coating (or after pre-baking) can be defined as the dry film thickness or can be defined as the average thickness of the coated film.

Next, the substrate including the coated film is baked. The baking conditions herein can be appropriately set according to the composition to be used and the type of the substrate. The temperature conditions that can be employed are, for example, 100° C. or higher, preferably 125° C. or higher, and more preferably 150° C. or higher. At the same time, the temperature conditions that can be employed are, for example, 700° C. or lower, preferably 600° C. or lower, and more preferably 500° C. or lower. When such temperature conditions are employed, a polysilazane (A) in the coated film can be stably transformed into silica with good process efficiency.

The time conditions that can be employed in the baking are, from the viewpoint of stably transforming a polysilazane (A) in the coated film into silica, for example, 10 minutes or more, preferably 15 minutes or more, and more preferably 20 minutes or more. At the same time, the time conditions that can be employed in the baking are, from the viewpoint of process efficiency, for example, 180 minutes or less, preferably 150 minutes or less, and more preferably 120 minutes or less.

The baking is typically carried out in the presence of water molecules for stably transforming a polysilazane (A) into silica. The water molecules may be moisture included in the composition. A polysilazane (A) may be transformed into silica by performing the baking in the presence of water (water vapor). Specifically, the baking can be performed under an air atmosphere including moisture, or the baking can be performed under an atmosphere positively including water vapor. Furthermore, from the viewpoint of further promoting this transformation into silica, the atmosphere for the baking can be an acid atmosphere or a basic atmosphere. In addition, from the viewpoint of further promoting the transformation into silica, the oxygen concentration in the atmosphere can be adjusted, or the atmosphere can include hydrogen peroxide vapor.

The apparatus for baking can be appropriately set as far as the desired baking temperature can be achieved. Specifically, as the apparatus for baking, a curing furnace (muffle furnace) or a hot plate can be used.

After the baking, annealing can be also further combined. The effects of, for example, further easily smoothening the surface of the obtained silica-based film and suppressing variation in the composition of the silica-based film can be expected by combining annealing. The annealing can be carried out in a similar atmosphere to that for baking and can be carried out, for example, by changing the temperature and other conditions of the curing furnace. The temperature for annealing is, for example, 300° C. or higher, preferably 400° C. or higher, and more preferably 500° C. or higher. At the same time, the temperature for annealing is, for example, 1300° C. or lower, preferably 1200° C. or lower, and further preferably 1000° C. or lower. The treatment time for annealing (annealing treatment time) is, for example, 5 minutes or more, preferably 10 minutes or more, and more preferably 15 minutes or more. At the same time, the treatment time for annealing (annealing treatment time) is, for example, 5 hours or less, preferably 4 hours or less, and more preferably 3 hours or less.

<<Additive Agent>>

An additive including the aforementioned nitrogen-containing polar organic solvent can be suitably used as an additive added to a silica-based film-forming composition including a polysilazane (A) and a solvent (S). An additive including a nitrogen-containing polar organic solvent is added to a silica-based film-forming composition including a polysilazane (A) and a solvent (S), and the composition is coated onto a substrate to form a coated film. After that, by baking the coated film, the curing uniformity of the coated film not only in the surface direction of the coated film but also in the thickness direction of the coated film is improved.

The additive may include other components other than the nitrogen-containing polar organic solvent of the present invention. Examples of other components include a solvent (S) other than the aforementioned nitrogen-containing polar organic solvent, an antioxidant, an ultraviolet absorber, a colorant, a surface active agent, a viscosity modifier and the like.

The present invention has been described above. It should be noted, however, that the present invention is not limited to the above embodiments, and the configuration can be also modified without changing the gist of the present invention.

EXAMPLES

The present invention will now be described in more detail by examples, but it is not limited to these examples.

Examples 1 to 4, Comparative Example 1

Components used in each of Examples and Comparative Example are shown below. Polysilazane (A)
(A)-1: perhydropolysilazane (weight-average molecular weight: about 1500) having a structural unit represented by Formula (A1) below. The above polysilazane A1 was used as a solution with a concentration of 20 mass % in di-n-butylether ((S)-1 described below).

[Chem. 13]

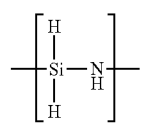

(A1)

(S) Organic solvent
(S)-1: di-n-butylether
(S)-2: 1,3-dimethyl-2-imidazolidinone (DMI)
(S)-3: N,N,N',N'-tetramethylurea (TMU)

In each of Examples and Comparative Example, the components were mixed in the proportions shown in Table 1 to prepare each composition.

As the substrate, a silicon substrate including a line portion with a height of 500 nm and a width of 400 nm and a space portion with a width of 100 nm (pattern formed portion) was used. The composition in each of Examples and Comparative Example was coated onto the silicon substrate by a spin coating method such that a dry film thickness was 700 nm, to form a coated film. The obtained coated film was pre-baked on a hot plate at 100° C. for one minute and at 150° C. for one minute, and then baked at 500° C. for 30 minutes under air conditions using a vertical baking furnace (TS8000 MB manufactured by Tokyo Ohka Kogyo Co., Ltd.) to obtain a silica-based film.

The formed silica-based film was etched using an aqueous solution of hydrofluoric acid with a concentration of 0.5 mass % at room temperature for 60 seconds. The end face of the silica-based film after etching was observed with an electron microscope to evaluate curing uniformity.

(Curing Uniformity)

A: The end face of the silica-based film after etching was almost uniformly etched.

B: On the end face of the silica-based film after etching, etching slightly proceeded in the substrate interface portion at a position corresponding to the space portion, compared to the top surface of the silica-based film.

C: On the end face of the silica-based film after etching, etching obviously proceeded in the substrate interface portion at a position corresponding to the space portion, compared to the top surface of the silica-based film.

TABLE 1

| | Polysilazane | Solvent (S) | | |
|---|---|---|---|---|
| | (A)<br>(A)-1<br>(parts<br>by mass) | (S)-1<br>(parts by<br>mass) | (S)-2<br>(parts by mass/parts<br>by mass/mass % to<br>polysilazane mass) | (S)-3 | Curing<br>uniformity |
| Example1 | 20 | 80 | 0.8/4% | 0 | A |
| Example2 | 20 | 80 | 1.6/8% | 0 | B |
| Example3 | 20 | 80 | 3.2/16% | 0 | B |
| Example4 | 20 | 80 | 0 | 0.8/4% | A |
| Example5 | 20 | 80 | 0 | 1.6/8% | B |
| Example6 | 20 | 80 | 0 | 3.2/16% | B |
| Comparative<br>Example1 | 20 | 80 | 0 | 0 | C |

According to Table 1, it is found that when a composition that includes a solvent (S) including a nitrogen-containing polar organic solvent together with a polysilazane (A) is used, a uniformly cured silica-based film can be formed. A difference in the etched amount in the thickness direction was small in the cured films in all Examples, according to the observation by electron microscope conducted in order to evaluate curing uniformity. That is, curing uniformity in the thickness direction was good.

On the other hand, when using a composition that included a polysilazane (A) but that did not include a nitrogen-containing polar organic solvent as a solvent (S) in Comparative Example, it was not easy to fully cure the inside of the coated film, and it was difficult to form a uniformly cured silica-based film.

What is claimed is:

1. A silica-based film-forming composition, comprising a polysilazane (A) and a solvent (S),
    wherein the solvent (S) comprises a nitrogen-containing polar organic solvent, and
    wherein the nitrogen-containing polar organic solvent comprises a compound having a partial structure represented by Formula (S1-1):

$$-NR^{s1}-C(=O)-NR^{s2}- \tag{S1-1}$$

wherein $R^{s1}$ and $R^{s2}$ are each independently a hydrogen atom or a hydrocarbon group which may include a substituent.

2. The silica-based film-forming composition according to claim 1, wherein the nitrogen-containing polar organic solvent comprises a compound represented by Formula (S2):

$$R^{s1}R^{s3}N-C(=O)-NR^{s2}R^{s4} \tag{S2}$$

wherein $R^{s1}$ to $R^{s4}$ are each independently a hydrogen atom or a hydrocarbon group which may include a substituent, and $R^{s3}$ and $R^{s4}$ are optionally bound to each other.

3. The silica-based film-forming composition according to claim 1, wherein in the Formula (S1-1), the $R^{s1}$ and the $R^{s2}$ are each independently an alkyl group having 1 or more and 4 or less carbon atoms.

4. The silica-based film-forming composition according to claim 2, wherein in the Formula (S2), the $R^{s1}$ to the $R^{s2}$ are each independently an alkyl group having 1 or more and 4 or less carbon atoms, and the $R^{s3}$ and the $R^{s4}$ are optionally bound to each other to form an alkylene group having 2 or more and 8 or less carbon atoms.

5. The silica-based film-forming composition according to claim 1, wherein the nitrogen-containing polar organic solvent comprises 1,3-dimethyl-2-imidazolidinone and/or N,N,N',N'-tetramethylurea.

6. A method of producing a substrate comprising a silica-based film, the method comprising:
    coating the silica-based film-forming composition according to claim 1 onto a surface of the substrate to form a coated film, and
    baking the coated film.

7. The method of producing a substrate comprising a silica-based film according to claim 6, wherein the surface of the substrate has unevenness.

* * * * *